United States Patent

[11] 3,604,660

| [72] | Inventor | Eugene I. Marley<br>Kirkwood, N.Y. |
|---|---|---|
| [21] | Appl. No. | 882,014 |
| [22] | Filed | Dec. 4, 1969 |
| [45] | Patented | Sept. 14, 1971 |
| [73] | Assignee | Rotorcraft Gyro Support System, Inc.<br>Callicoon, N.Y. |

[54] HELICOPTER SENSOR PLATFORM ASSEMBLY
18 Claims, 5 Drawing Figs.

[52] U.S. Cl. ..................................................... 244/17.11,
95/12.5, 324/4
[51] Int. Cl. ....................................................... B64c 27/00
[50] Field of Search........................................... 244/17.11,
17.17, 118, 137; 95/12.5; 324/4, 8

[56] References Cited
UNITED STATES PATENTS

| 3,123,766 | 3/1964 | Ruddock et al. | 324/4 |
| 3,240,139 | 3/1966 | Madden | 95/12.5 |
| 3,523,660 | 8/1970 | Attebery et al. | 244/17.11 |

*Primary Examiner*—Milton Buchler
*Assistant Examiner*—Paul E. Sauberer
*Attorney*—Richard G. Stephens

ABSTRACT: A plurality of load platforms which may carry sensing devices or counterbalance weight are carried externally of the cabin of a helicopter on a rigid frame which extends inside the helicopter fuselage and is carried on a gyrostabilized gimballed suspension with the gimbal axes near the helicopter center of gravity.

INVENTOR.
EUGENE I. MARLEY

HELICOPTER SENSOR PLATFORM ASSEMBLY

My invention relates to aircraft apparatus, and more particularly, to improved apparatus for supporting and controlling a variety of sensors on a helicopter. Helicopters are generally preferred over fixed-wing aircraft for a number of operations, such as magnetic prospecting. Magnet prospecting, which is commonly used to locate iron ore deposits, for example, usually involves flying an aircraft over a terrain area to detect and record magnetic anomalies by means of a magnetometer. Signals from the magnetometer are commonly recorded with a conventional strip chart galvanometer recorder, and a camera carried in the aircraft and synchronized with the recorder continuously photographs the terrain so that the locations at which magnetic anomalies occur may be later identified. As the aircraft yaws, rolls and pitches, the terrain area photographed by the camera changes. In order that electrical equipment in the aircraft, and more importantly, magnetic materials in the aircraft, not affect the magnetometer readings, it has been common to suspend the magnetometer on a lengthy flexible nonmagnetic cable or a rigid boom which trails behind the aircraft. Such cables or booms typically have been 10 to 200 feet long. If mounted on a rigid boom, the magnetometer is undesirably raised or lowered as the aircraft pitches and undesirably moved from side to side as the aircraft yaws. If mounted on a flexible cable, the height of the magnetometer undesirably varies with airspeed, and the slipstream, turbulence, or wind may cause sidewise motion of the magnetometer. Such arrangements also frequently result in the cable becoming twisted. Twisting of the cable also creates electrical noise which sometimes interferes with the magnetometer signal. Such arrangements, which have been used both with helicopters and fixed-wing aircraft, have the further disadvantage that such undesirable movements of the magnetometer and camera interfere with accurate magnetic measurement and result in magnetic measurement at various times of terrain other than that being photographed by the camera at such times, or of terrain other than that desired to be prospected. Reflight over a given area in order to cover portions which may have been missed is ordinarily very expensive, requiring very precise navigation in order to locate a portion previously missed. One object of the present invention is to provide an aircraft instrumentation system in which a variety of sensing devices, such as magnetometers and cameras may be carried and operated in a stabilized manner, so that attitude changes do not adversely affect the signals or pictures received by such sensing devices.

In the prior art, aircraft also have been equipped with infrared sensors instead of, or in addition to, magnetometers, to detect terrain moisture content and thermal pollution of lakes and rivers, for example, and attitude changes of the aircraft have similarly interfered with the correlation between the temperature signals from the infrared sensor and the terrain photographs taken by the camera.

Aside from magnetic or thermal anomaly detection, it is sometimes desirable to use an aircraft to provide aerial views of terrain for various other purposes, such as aerial mapping, or the provision of motion picture films to create visual displays for grounded flight trainers and simulators. One known form of flight trainer visual display utilizes motion picture films showing what a pilot would see as an aircraft proceeds down a glide path and lands at an airport. When used with the simulator, such films must not exhibit any aircraft attitude changes or appearance of sidewise movement if the pilot being trained operates the trainer controls in a manner which would not cause such changes or movement in an actual aircraft, and hence it is necessary that the successive film frames in such a film strip each be taken at an accurately determined angle from an accurately determined position along an accurately determined path. The accuracy required has made it impossible to obtain acceptably accurate film strips by photographing the airport during a normal descent in either a fixed-wing aircraft or a helicopter. The attitude changes which accompany approach and landing of a fixed-wing aircraft preclude the production of usable film frames, and attitude changes made to steer the aircraft and those due to gusts of wind spoil the film strips made on many such flights. While a helicopter may be flown as slowly as desired, attitude changes due to gusts of wind and the lesser attitude stability of a helicopter have made it extremely difficult to produce acceptable film strips using a helicopter. The problem has been sufficiently difficult that the prior art sometimes has resorted to use of a camera mounted on a tower carried on a truck. Because the height of the tower is necessarily limited, it is obvious that such a technique is useful for photographing only a small terminal portion of a descent. While a sufficient number of accurate pictures can be obtained by photographing many descents along the same path, the film editing required to match the acceptable frames then becomes so tedious and time-consuming as to be prohibitively expensive. It is desirable for effective training to provide motion picture film strips showing such landings, (and takeoffs also) at each of the airports to which a pilot may travel, but in the past the provision of such films has been extremely expensive. It is another object of the invention to provide a helicopter having a stabilized platform so that film strips of the type described may be produced at far less expense. Because a helicopter has various advantages over a fixed-wing aircraft for each of the mentioned applications and can be used for any one of the mentioned operations, it is another object of the invention to provide a helicopter having a stabilized platform which is useful for carrying any one of the mentioned sensing devices. Indeed, because some of the operations require or desirably include the use of two or more such sensing devices, it is another object of the invention to provide a helicopter having plural stabilized platforms.

Because of the much greater cost of double-rotor helicopters, it is highly desirable that the mentioned aerial operations be performed using single-rotor helicopters. In a single rotor helicopter it is extremely important that equipment carried by a helicopter not shift the center of gravity of the helicopter, and thus it is an important object of the invention to provide a helicopter with a stabilized equipment-carrying platform which does not seriously affect the location of the center of gravity.

One known prior art helicopter is provided with a gyrostabilized remote-controlled camera platform contained within a Fiberglas sphere which mounts below the helicopter fuselage, between the helicopter skids and extending down below the level of the skids. The Fiberglas sphere contains a transparent Plexiglas window through which the camera views the terrain. The camera and platform equipment require so much space that the sphere is approximately five feet in diameter. Because the sphere must extend below the helicopter skids, the helicopter cannot land on an ordinary flat surface, and a special landing device, such as a railroad flatcar having a hole or recess to accommodate the sphere, must be provided. Also, in order that the sphere not topple the helicopter or punch through the bottom of the helicopter fuselage if an engine failure occurs when the helicopter is not near its special landing device, the sphere carrying the camera and stable platform are made jettisonable, so that they may be dropped from the helicopter in the event of engine failure. Jettisoning the camera and platform equipment not only damages or destroys these devices, but may cause serious damage or injury to objects or persons on the ground, so that use of the mentioned helicopter over populated areas is so dangerous as to be ordinarily prohibited. It is not feasible to reduce the height of such a sphere so that it need not project below the helicopter skids, since such an arrangement would seriously restrict the vertical field of view of the camera, and would result in a magnetometer being influenced by metal near the floor of the helicopter. It is not feasible to increase the height of the skids sufficiently to overcome the problem, since that tends to render the helicopter unstable. An important object of the present invention is to provide a helicopter with a stabilized equipment-carrying platform which can carry as much or more equipment as the sphere, but which need not extend below the helicopter skids (or wheels), so that ordinary use of the landing skids is not interfered with and the equipment-carrying platform need not be jettisoned in the event of engine failure.

A further object of the invention is to provide a helicopter with a stabilized equipment-carrying platform which adds little to drag and has little effect upon the flying qualities of the helicopter. Another object of the invention is to provide such a platform in a manner such that it can be adapted to existing helicopters with minimum expense, and without modification of crucial structural members of the helicopter fuselage.

Other objects of the invention will in part be obvious and will, in part, appear hereinafter.

The invention accordingly comprises the features of construction, combination of elements and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 illustrates a preferred embodiment of the load platform utilized in connection with a turbine-powered single-rotor helicopter drawn to resemble the widely used Bell 206A Jet Ranger helicopter, and FIG. 2 illustrates the load platform in greater detail, with the nose portion of the helicopter shown in phantom.

Figure 1:
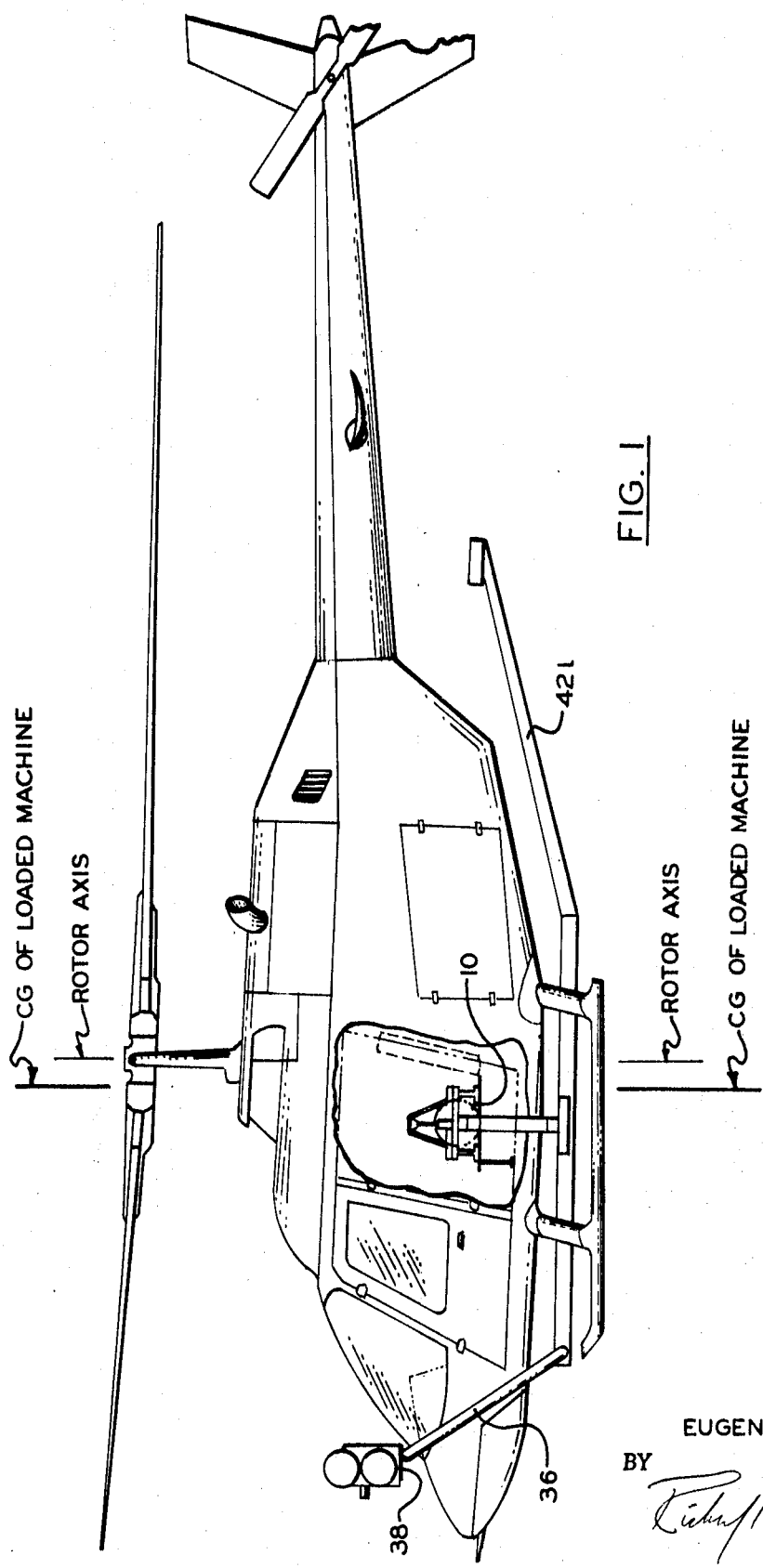
FIG. 1 is a side view of a helicopter incorporating one embodiment of the invention.
Figure 2:
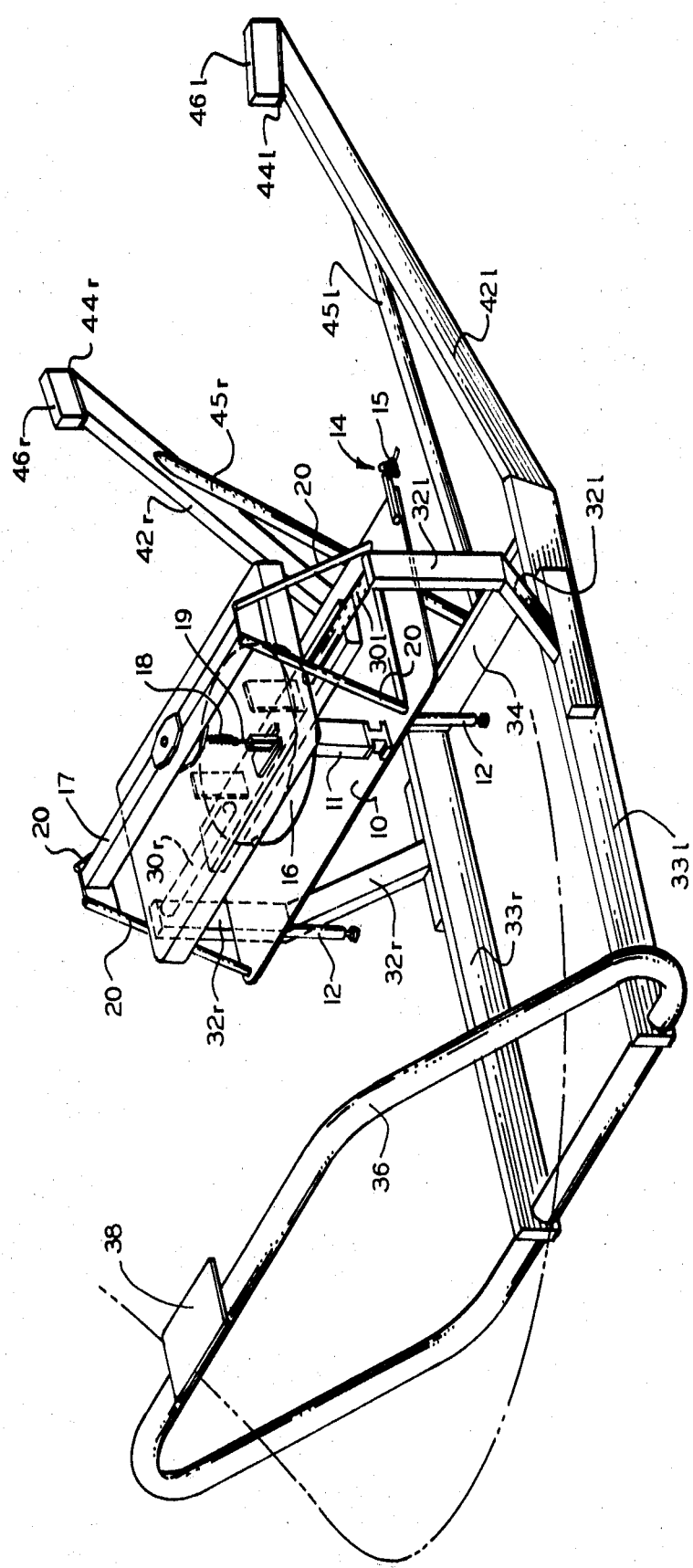
FIG. 2 is an isometric view of a preferred embodiment of helicopter platform constructed in accordance with the present invention.

Each of the structural members of the assembly to be described are preferably fabricated of aluminum to minimize the weight of the assembly. Inside the cabin of the helicopter a fixed baseplate 10 fixedly mounted in a generally horizontal plane extends substantially across the width of the cabin, and is shown in FIG. 1 installed in the location which the rear seat cushion usually occupies. The front edge of plate 10 is fixed to the floor of the rear seat foot well by support legs 12, 12, and secured at both the corners of its rear edges by pivot pins, such as shown at 14, where pin 15 engages the usual seatbelt retainer of the helicopter. It will be apparent that plate 10 may be fixedly secured relative to the helicopter inside the helicopter cabin in a variety of ways. Mounted atop plate 10 on four legs, 11, 11, only one which is shown in FIG. 2, is the stationary portion of a three-axis gimbal or Cardan suspension 16, which is shown in greater detail in FIGS. 3a and 3b. Laterally-extending brace 17 is fixedly mounted above plate 10 and suspension 16 by means shown as comprising four legs 20, 20, and a spring 18, the force of which is made adjustable by means of turnbuckle 19, connects between fixed brace 17 and the movable output portion or "azimuth ring" 25 of gimbal suspension 16. By adjustment of turnbuckle 19, the weight of the overall load platform may be transferred from the gimbal bearings of suspension 16 to brace 17 and plate 10 and hence to the helicopter fuselage, thereby decreasing the torque needed by the servomotors of the gimbal suspension. In FIG. 2 only plate 10, its mentioned connections to the helicopter fuselage, the stationary portion of gimbal suspension 16, brace 17 and legs 20, 20 are fixed relative to the helicopter fuselage, and all other parts shown in FIG. 2 are capable of limited rotation relative to the helicopter fuselage.

Figure 3A:
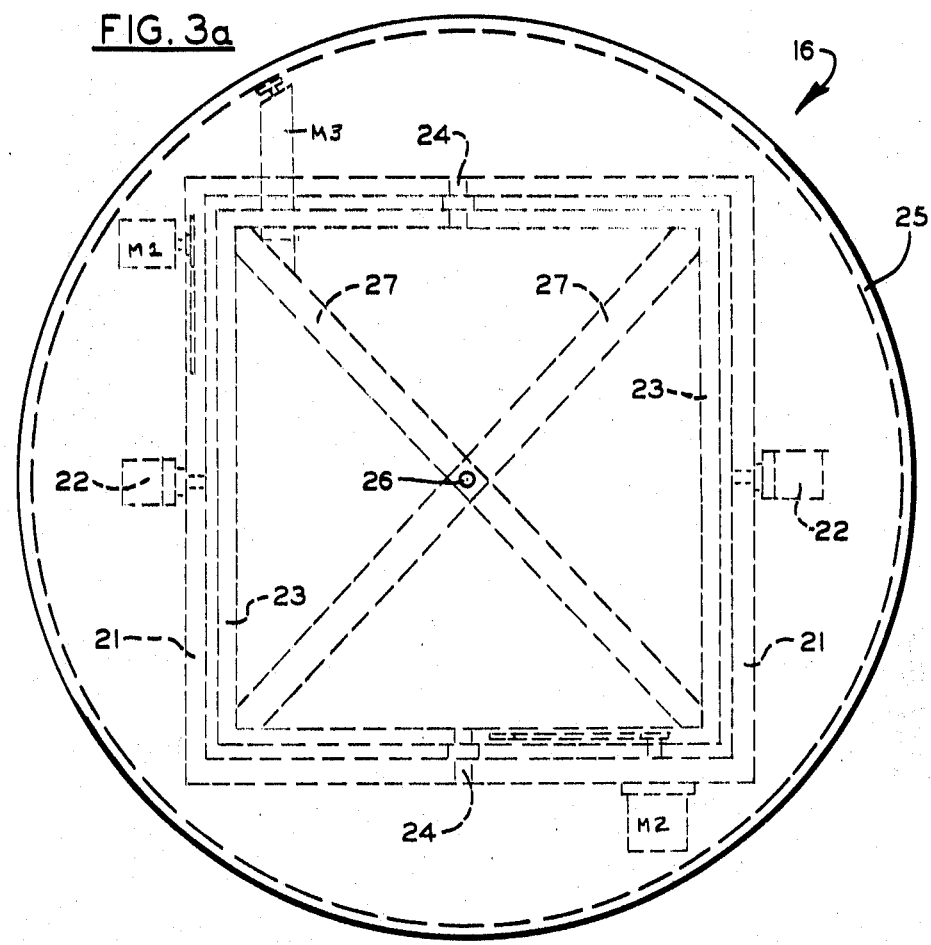
FIGS. 3a and 3b are semischematic top and side views illustrating the principles of operation of a servo-stabilized gimbal system utilized with the invention.
Figure 3B:
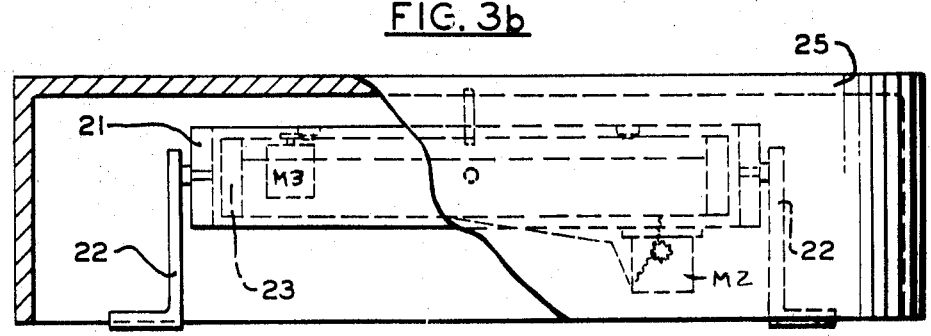
Figure 4:
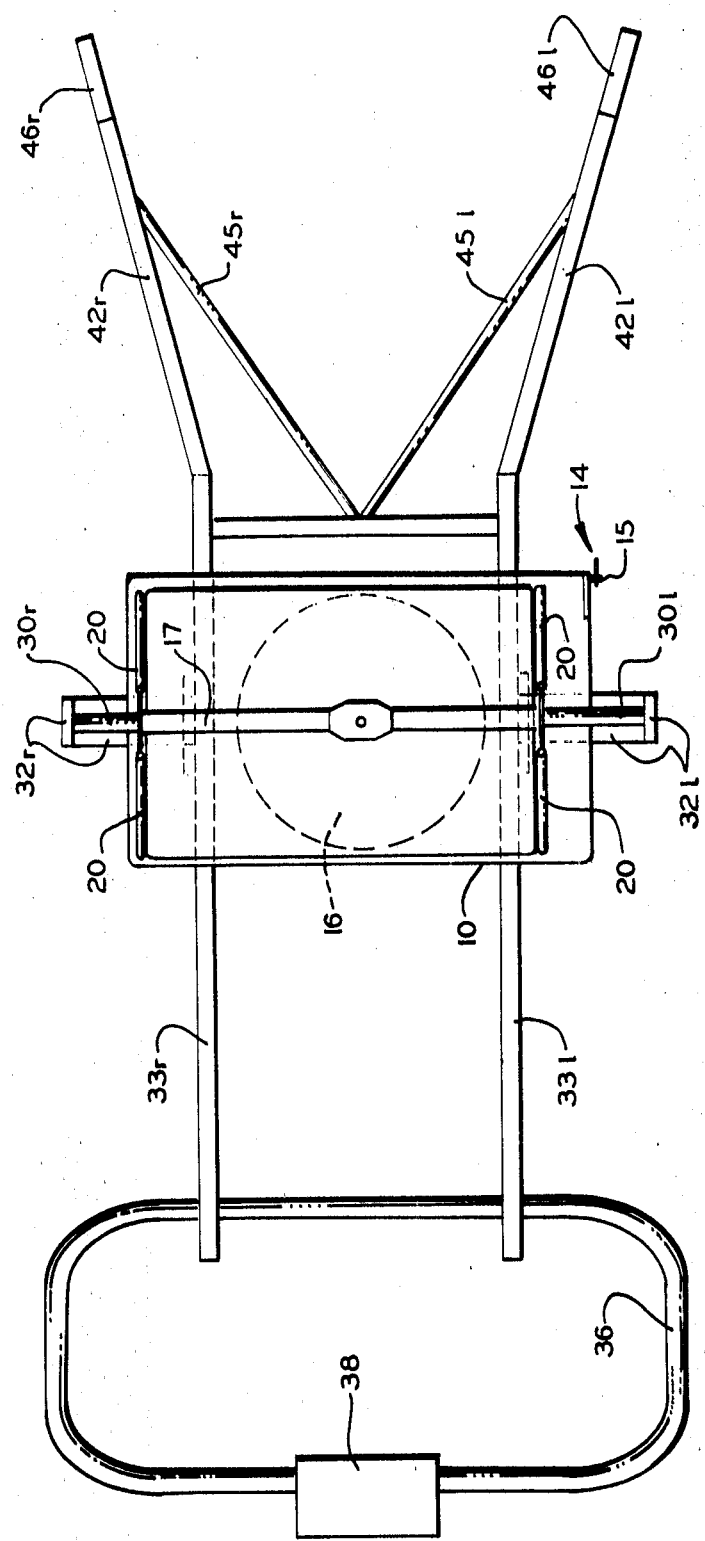
FIG. 4 is a top view of the device of FIG. 2.

As shown semischematically in FIGS. 3a and 3b gimbal suspension 16 includes an outer ring 21 which is pivotally mounted on stub shafts and bearings extending from fixed supports 22, 22, an inner ring 23 which is pivotally mounted on stub shafts and bearings carried at 24, 24 on ring 21, and an azimuth plate 25 rotatably carried on a shaft 26 carried on braces 27, 27 carried by ring 23. The pivot axes of rings 21 and 23 and the axis of shaft 26 preferably all intersect at a common point. Servomotor M2 is carried on outer ring 21 and a pinion on the shaft of motor M2 engages a gear sector carried on inner ring 23, so that operation of servomotor M2 positions inner ring 23 about the axis of shafts 24, 24. Servomotor M1, which is fixedly mounted to the base of the suspension, similarly positions outer ring 21 relative to the base of the suspension. Motor M3 is carried on brace 27 of inner ring 23, and a pinion on the shaft of motor M3 engages a toothed section of the periphery of rotatable azimuth plate 25 to rotate plate 25 about the axis of shaft 26. As will be explained below, a rotatable azimuth plate such as 25 need not be provided in some embodiments of the invention, in which case shaft 26 and motor M3 may be eliminated (and installed instead in a remote-load platform such as 38, 42l or 42r). The three servomotors of the gimbal suspension may be driven in conventional fashion by amplified signals from gyroscopes (not shown) carried within the helicopter. Conventional followup transducers (not shown) measure the angular position of rings 21 and 23 and plate 25 and provide feedback signals to the amplifiers which drive motors M1 to M3. The gyroscopes and servoamplifiers (not shown) are preferably mounted remote from the gimbal suspension, and the electrical connections to motors M2 and M3 and to followup transducers are made through flexible wires (not shown). As an alternative to the system shown, three gyros can be mounted on rings 21, 23 and plate 25, respectively, and then the three followup position transducers can be eliminated. Three-axis gimballed servo-stabilized platforms are well known in the art and it should be emphasized that the structure shown schematically in FIGS. 3a and 3b is exemplary only. Because the system of the invention requires a relatively large mass to be stabilized, the servomotors used with the invention ordinarily will be considerably more powerful than those used in most other aircraft applications. In one exemplary embodiment of the invention, gimbal suspension 16 is capable of a pitch axis variation of ±10°, a roll axis variation of ±10°, and an azimuth variation of ±10°. It is highly desirable that the intersection of the three gimbal axes of suspension 16 be located very near the center of gravity of the helicopter, which is ordinarily directly below and closely aligned on the axis of the rotor mast in a properly loaded helicopter. Because the weight of the overall load platform is applied to the helicopter fuselage substantially at the center of gravity of the helicopter, the weight of the platform, and that of the equipment carried on the platform, has minimum adverse effect on the stability and flying qualities of the helicopter.

Returning to FIG. 2, arms 30l and 30r are fixedly attached preferably by welding to bar 29 affixed to azimuth ring 25 of gimbal suspension 16, and extend laterally in opposite directions from inside the cabin out through oversize holes cut in the side of the cabin or in the rear cabin doors, the sizes of the holes being great enough to allow desired limited amounts of rotation of the load platform relative to the fuselage. In one embodiment of the invention circular holes approximately 12 inches in diameter were cut in the rear cabin doors. Flexible rubber boots surrounding arms 30l and 30r may be affixed to the edges of the holes to seal the cabin from outside air. A phantom circle in FIG. 1 illustrates the position of the holes.

Brackets 32l and 32r welded to the outer ends of arms 30l and 30r extend downwardly and inwardly, to support longitudinal frame members 33l and 33r below the helicopter fuselage in between the skids (not shown in FIG. 2) of the helicopters, with the bottom edges of members 33l and 33r substantially above the bottom edges of the helicopter skids. Cross brace 34 extends between, and rigidly ties together, longitudinal frame members 33l and 33r.

Ring 36, preferably formed of aluminum tubing, is welded to the front ends of longitudinal frame members 33l, 33r and extends upwardly to surround or encircle the nose of the helicopter, as best seen in FIG. 1, and platform 38 is rigidly affixed to ring 36, preferably at the nominal centerline of the aircraft. Because longitudinally extending members 33*l* and 33*r* extend below the fuselage and ring 36 extends upwardly from members 33*l* and 33*r*, none of the structure of the invention interferes with the opening of the front doors of the aircraft, which is important in the event of an emergency where quick evacuation of the aircraft is necessary. A platform (not shown) may be mounted on platform 38 and arranged to be rotated relative to platform 38 by a servomotor in the manner in which plate 25 is rotated relative to inner ring 23 in FIG. 3*a*, in lieu of providing azimuthal rotation of plate 25. In fact, the elimination of azimuthal rotation at suspension system 16 and the use of azimuthal rotation at one or more of the outside platforms (38, 42*l*, 42*r*) is preferred. The size of the holes in the sides of the helicopter through which arms 30*l* and 30*r* extend limits azimuthal rotation to a small amount, e.g. ±10°, where azimuthal rotation of the entire frame is utilized. If an azimuthally rotatable platform is provided on one of the external load platforms, it will be seen that far greater, practically unlimited azimuthal rotation may be provided. Ordinarily azimuthal rotation will be limited to somewhat less than 360° in order to obviate the need for electrical slip rings. For sake of economy, a single rotatable drive may be made easily detachable so that it may be readily moved from one to another of the three external platforms, with the output of the azimuth servo power amplifier routed through cables to plugs at all three external platforms. In some applications, the remote azimuth motor may be controlled manually instead of by a gyro.

Rigid arms 42*l* and 42*r* extend rearwardly and upwardly from the rear ends of longitudinal frame members 33*l*, 33*r* to carry counterweight platforms 44*l* and 44*r* aft of the helicopter cabin, and brackets 45*l* and 45*r* serve to stiffen or support arms 42*l* and 42*r*. Platforms 42*l* and 42*r* carry boxlike receptacles 46*l*, 46*r* which are arranged to carry either sensing devices or lead weights. Weights are placed on rear platforms 42*l* and 42*r* so as to counterbalance the weight of the camera or other device carried on front platform 38. If camera or other sensor equipment is carried on one or both of the rear platforms instead of on front platform 38, weights may be placed on platform 38 as a counterbalance. Irrespective of which of the three platforms carry sensor equipment, it will be seen that weights may be placed on various of the three platforms so as to counterbalance the overall platform mechanism about both the lateral (*y*) axis and the longitudinal (*x*) axis.

For purposes such as aerial mapping where a downward camera view is required, a conventional aerial mapping camera may be affixed to cross brace 34, or to a plate (not shown) affixed to brace 34, to support the mapping camera below the fuselage laterally in between arms 32*l* and 32*r*. In fact, in versions of the invention designed specifically for such a purpose, brace 34 may extend laterally between the lower ends of arms 32*l* and 32*r* and the longitudinally extending members (33*l*, 33*r*, 42*l*, 42*r*, 45*l*, 45*r*) may be eliminated. Because cross brace 34 is situated very near the center of gravity, any need for counterbalancing the mapping camera is obviated. A platform rotatably mounted on brace 34 to carry the camera may be arranged to be azimuthally rotated, either manually or automatically, in the same manner as described for the other load platforms.

Inasmuch as most of the assembly external to the helicopter fuselage is formed primarily of longitudinally extending members, it will be apparent that the assembly adds very modestly to drag. Though not shown in FIG. 2, it will be apparent that various of the external members shown may be streamlined, if desired.

It will be apparent that adaptation of the invention to existing helicopters is easily accomplished, requiring only that the two holes be cut in the two doors. Many operations, such as where speed need not be great, can be performed by complete removal of the two doors instead of cutting holes in them. While the invention has been described in connection with a specific model helicopter, it will be apparent to those skilled in the art that the disclosed principles of the invention are readily applicable to platforms for a wide variety of different helicopters.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. An external load-carrying assembly for use with a turbine-powered helicopter, comprising, in combination: gimbal suspension means located within the cabin of said helicopter, said gimbal suspension means including a first member nonrotatably affixed to the fuselage of said helicopter, a second member rotatable relative to said first member about a pair of axes, and gyrocontrolled motive means for stabilizing said second member; rigid arm means attached to said second member and extending laterally outwardly from inside said cabin through openings in the sides of said fuselage; support means extending beneath said fuselage laterally inwardly from said sides of said fuselage; rigid members connecting the outer ends of each of said rigid arm means to said support means; and a load platform affixed to said support means.

2. An assembly according to claim 1 in which said support means extend longitudinally beneath said fuselage.

3. An assembly according to claim 1 in which said support means extend laterally beneath said fuselage between the outer ends of said rigid arm means.

4. An assembly according to claim 1 in which the intersection of said axes of said gimbal suspension means is located substantially at the center of gravity of said helicopter.

5. An assembly according to claim 1 in which said load platform includes a rotatable member and further motive means for rotating said rotatable member relative to said load platform.

6. An assembly according to claim 1 in which said second member of said gimbal suspension means is rotatable relative to said first member of said suspension means about a third axis.

7. An assembly according to claim 1 having a camera mounted on said load platform.

8. An assembly according to claim 1 having spring means connected between structure affixed to said fuselage and said second member of said gimbal suspension means to transfer a portion of the weight of said assembly to said structure affixed to said fuselage.

9. An assembly according to claim 2 having a rigid generally ring-shaped member affixed to said longitudinally extending support means and encircling a nose portion of said fuselage, said load platform being carried on said ring-shaped member.

10. An assembly according to claim 2 having at least one rigid further arm extending rearwardly and upwardly from said longitudinally extending support means to a position rearwardly and laterally outwardly from said cabin, said load platform being carried at said position on said rigid further arm.

11. An assembly according to claim 2 having a pair of rigid further arm members extending laterally in opposite directions from said longitudinally extending support means and extending rearwardly and upwardly from said longitudinally extending support means to positions which are both rearward and laterally outward from said cabin; said load platform being carried on one of said further arm members, and a second load platform carried on the other of said further arm members.

12. An assembly according to claim 2 having first means extending forwardly from one end of said longitudinally extending support means to support said load platform forwardly of the windscreen of said helicopter and second means extending rearwardly from the other end of said longitudinally extending support means to support a second load platform rearwardly of the cabin of said helicopter.

13. An assembly according to claim 2 in which said helicopter includes landing gear extending below said fuselage, said longitudinally extending support means being situated above the lower extremities of said landing gear.

14. An assembly according to claim 2 in which said helicopter includes landing gear means extending below said fuselage with two portions on opposite sides of the longitudinal centerline of said fuselage, said longitudinally extending support means being situated laterally in between said two portions of said landing-gear means.

15. An assembly according to claim 8 having means for adjusting the force of said spring means.

16. An assembly according to claim 10 in which said load platform is located forwardly of the windscreen of said fuselage.

17. An assembly according to claim 11 in which the portion of said assembly outside said fuselage is symmetrically disposed about the longitudinal centerline of said fuselage, and in which said load platforms include means for carrying weights to balance said assembly.

18. An assembly according to claim 12 in which said second load platform is positioned at a lower level than the other load platform.